United States Patent [19]
Nicoli et al.

[11] Patent Number: 5,461,226
[45] Date of Patent: Oct. 24, 1995

[54] PHOTON COUNTING ULTRAVIOLET SPATIAL IMAGE SENSOR WITH MICROCHANNEL PHOTOMULTIPLYING PLATES

[75] Inventors: Anthony M. Nicoli, Chelmsford; Warren L. Clark, Billerica; John H. Hirs, Winchester; Neal R. Butler, Acton, all of Mass.

[73] Assignee: Loral Infrared & Imaging Systems, Inc., Lexington, Mass.

[21] Appl. No.: 145,392

[22] Filed: Oct. 29, 1993

[51] Int. Cl.⁶ .................................................. H01J 40/14
[52] U.S. Cl. ............................... 250/214 VT; 250/336.1
[58] Field of Search ............................ 250/214 VT, 207, 250/336.1, 365, 372; 313/527, 528, 539, 105 CM, 103 CM

[56] References Cited

U.S. PATENT DOCUMENTS

| | | | |
|---|---|---|---|
| 3,798,453 | 3/1974 | McIlwain | 250/213 VT |
| 4,070,578 | 1/1978 | Timothy et al. | 250/336 |
| 4,086,486 | 4/1978 | Bybee et al. | 250/207 |
| 4,349,277 | 9/1982 | Mundy et al. | 356/376 |
| 4,395,636 | 7/1983 | Anger et al. | 250/366 |
| 4,443,701 | 4/1984 | Bailey | 250/332 |
| 4,554,447 | 11/1985 | Howard et al. | 250/216 |
| 4,721,885 | 1/1988 | Brodie | 313/576 |
| 4,794,296 | 12/1988 | Warde et al. | 313/105 R |
| 4,845,552 | 7/1989 | Jaggi et al. | 358/93 |
| 4,872,051 | 10/1989 | Dye | 358/103 |
| 4,935,817 | 6/1990 | Gilligan | 358/211 |
| 5,001,348 | 3/1991 | Dirscherl et al. | 250/372 |
| 5,099,128 | 3/1992 | Stettner | 250/370.11 |
| 5,103,083 | 4/1992 | Reed et al. | 250/213 VT |
| 5,111,035 | 5/1992 | de Luca | 250/213 VT |
| 5,131,742 | 7/1992 | Schaff | 356/73 |
| 5,195,118 | 3/1993 | Nudelman et al. | 378/99 |
| 5,304,815 | 4/1994 | Suzuki et al. | 257/10 |
| 5,311,010 | 5/1994 | Kruger | 250/214 VT |

OTHER PUBLICATIONS

Timothy, J. G. et al., "Two-dimensional photon-counting detector arrays based on microchannel array plates", *Rev. Sci. Instrum.*, vol. 46, No. 12, Dec. 1975, pp. 1615–1623, ©1975 by the American Institute of Physics.

Sandie, William G. et al., "Atmospheric Emissions Photometric Imaging Experiment for Spacelab 1", *Optical Engineering*, vol. 22, No. 6, pp. 756–764, Nov./Dec. 1983.

Blavette, D., "The Tomographic Atom Probe: A Quantitative Three-Dimensional Nanoanalytical Instrument on an Atomic Scale", *Rev. Sci. Instrum.*, 64 (10), pp. 2911–2919, Oct. 1993, © 1993 American Institute of Physics.

Sandie, W. G. et al., "Characteristics of a Microchannel Plate Intensifier", *IEEE Transactions on Nuclear Science*, vol. NS–29, No. 1, pp. 212–216, Feb. 1982.

*Primary Examiner*—Edward P. Westin
*Assistant Examiner*—Steven L. Nichols
*Attorney, Agent, or Firm*—Leone & Moffa

[57] ABSTRACT

An integrated optical system illuminates an ultraviolet spatial detector with an image from a field of interest. The ultraviolet spatial detector is comprised of an electron multiplying microchannel plate and a 100 pixel discrete anode array using a high strip current microchannel plate. The discrete anode array preserves the spatial distribution of the image. The ultraviolet spatial sensor has a wide field of view. The ultraviolet spatial detector has a photon counting sensor capable of detecting ultraviolet sources to determine their position to within plus or minus 4.5 degrees.

16 Claims, 4 Drawing Sheets

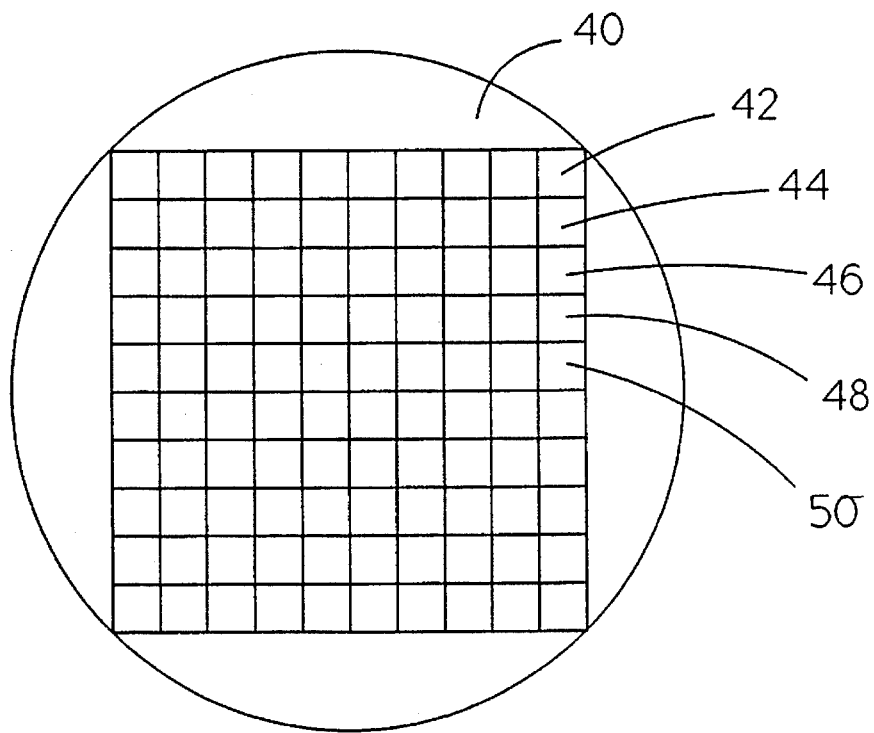
Fig_ 3

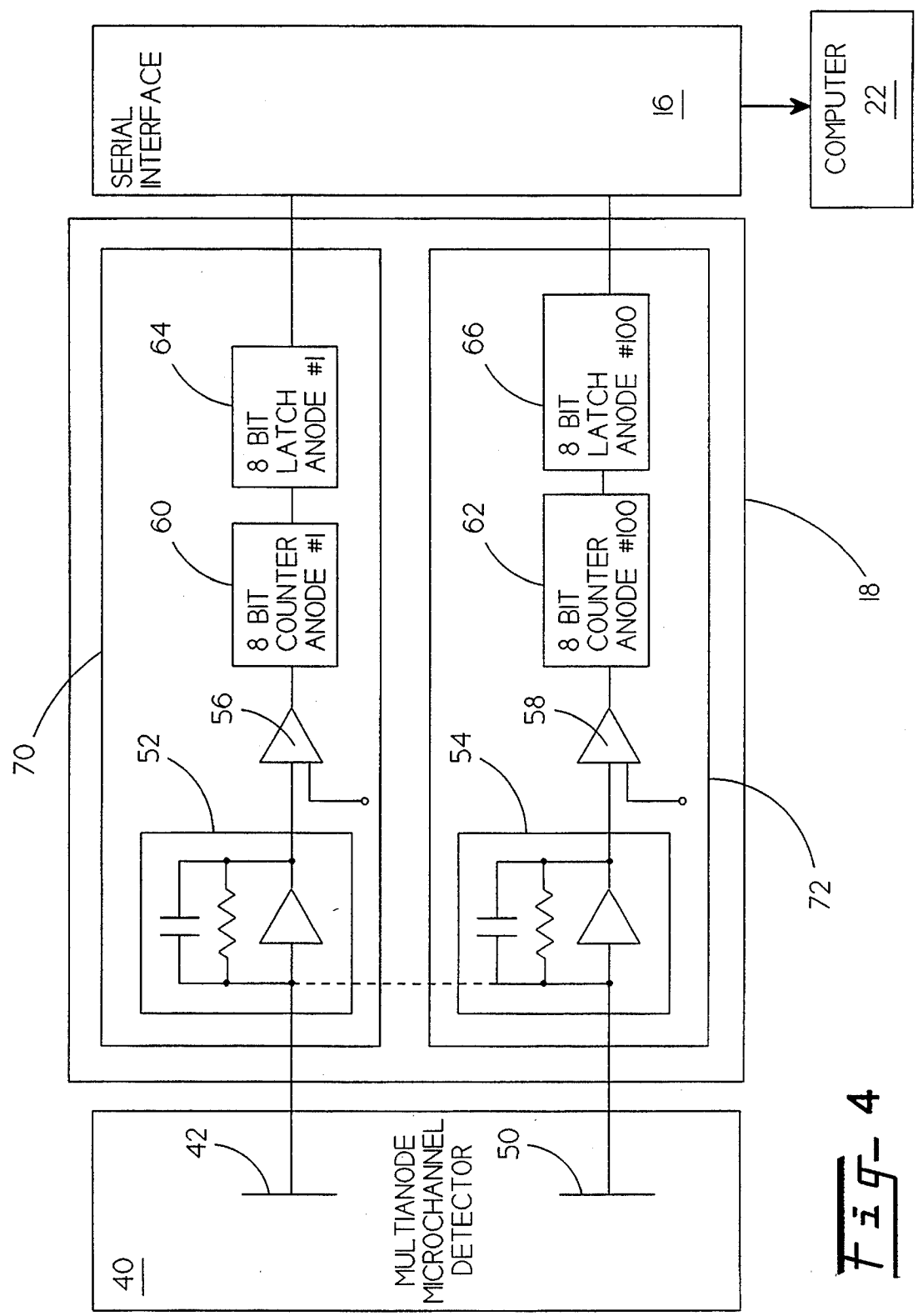

PHOTON COUNTING ULTRAVIOLET SPATIAL IMAGE SENSOR WITH MICROCHANNEL PHOTOMULTIPLYING PLATES

The invention relates to an ultraviolet spatial sensor and more particularly to a wide-field-of-view photon counting sensor using a microchannel plate and a discrete anode array.

BACKGROUND OF THE INVENTION

Prior art devices based on charge centroiding techniques such as the resistive anode and wedge strip anode, provide good resolution but suffer from coincidence losses. During periods of intense radiation they generate spurious signals spatially located between two actual photo events. This occurs when their centroiding electronics cannot temporarily resolve multiple photo events. These losses manifest themselves in either false targets or loss of signal and therefore lead to false target detections or decreasing sensitivity of the detector. This behavior may undermine the performance of an application utilizing this type of sensor. The present invention seeks to avoid this behavior since centroiding of individual photo events is not necessary.

U.S. Pat. No. 4,395,636 to Hal O. Anger, et al., entitled "Radiation Imaging Apparatus," describes a radiation imaging system using a charge multiplier and a position sensitive anode for detecting the centroid position of a charge cloud. The apparatus has two dimensional position coordinate readout capability. The apparatus images incident photons, ions, electrons, or nuclear particles, and has a high inherent spatial and linear resolution. The apparatus disclosed includes systems which use the fast response of microchannel plates, position sensitive repetitive strip and wedge region anodes, and preamps to perform scintillation pulse height analysis digitally.

U.S. Pat. No. 4,845,552 to Bruno Jaggi, et al., entitled "Quantitative Light Microscope Using a Solid State Detector in the Primary Image Plane," describes a solid state microscope apparatus for viewing and scanning microscopic objects. The microscope comprises a light source with a condenser and diffusion filter. The image is projected directly, through one high resolution lens (an objective), onto a large two-dimensional CCD-array or similar solid state image sensor located in the intermediate plane of the objective lens. The sensed discrete image is digitized, conditioned and processed in real time and displayed on a high resolution monitor.

U.S. Pat. No. 4,872,051 to Robert H. Dye, entitled "Collision Avoidance Alarm System," describes an apparatus for detecting the presence of any object on a collision course with a platform or vehicle carrying the apparatus and for generating an alarm upon such detection. A wide-angle television system is used for viewing a scene and providing a plurality of electrical signals corresponding to, and representing the spatial distribution of radiation emanating from the scene. The optical sensor used is optionally of a visibles infrared, or ultraviolet type. Consecutive spatial centroids of an object are computed and used in conjunction with an object's extent to establish possibility of collision.

U.S. Pat. No. 5,131,742 to Fred L. Schaff, entitled "Acousto-Optic Spectrometer/Polarimeter," describes a device which allows broad-band imaging, spectroscopy and polarimetry to be performed simultaneously, and through the same optical aperture. The device comprises an acousto-optic spectrometer/polarimeter for analyzing an incident broad-band beam including an acousto-optic tunable filter for separating the incident broad-band beam into a diffracted extraordinary narrow-band beam, a diffracted ordinary narrow-band beam, and at least one undiffracted broad-band beam. The device further comprises three detectors, each respectively positioned to receive at least a portion of the respective beams and provide first, second, and third signals thereon. Means are provided for radio frequency control, and for transducing an acoustic wave in the acousto-optic tunable filter.

SUMMARY OF THE INVENTION

The invention provides a wide field of view photon counting sensor for detecting radiation sources of a predetermined frequency range. The sensor comprises an integrated filter-optic element which provides an image signal from a scene of interest to a spatial detector. The detector is comprised of a photo cathode, an electron multiplying microchannel plate and a discrete anode array. The microchannel plate and array combine to preserve the spatial distribution of the image. The sensor uses counting electronics to measure a signal that is proportional to the detected radiation source.

In one alternate embodiment of the invention, the counting electronics are connected to a serial interface which provides each anode signal to a computer processor. In one embodiment of the invention, the detector allows the determination of an ultraviolet source to within plus or minus 4.5 degrees.

In yet another aspect of the invention, the integrated filter-optic means detects images in the middle ultraviolet range while rejecting radiation outside the middle ultraviolet range.

Other objects, features and advantages of the present invention will become apparent to those skilled in the art through the description of the preferred embodiment, claims and drawings herein wherein like numerals refer to like elements.

BRIEF DESCRIPTION OF THE DRAWINGS

To illustrate this invention, a preferred embodiment will be described herein with reference to the accompanying drawings.

FIG. 3 shows the 10×10 discrete anode array used in the ultraviolet spatial sensor of the invention.

FIG. 4 shows a sensor electronics block diagram used in the ultraviolet spatial sensor of the invention.

DETAILED DESCRIPTION OF THE PREFERRED EMBODIMENT

Figure 1:
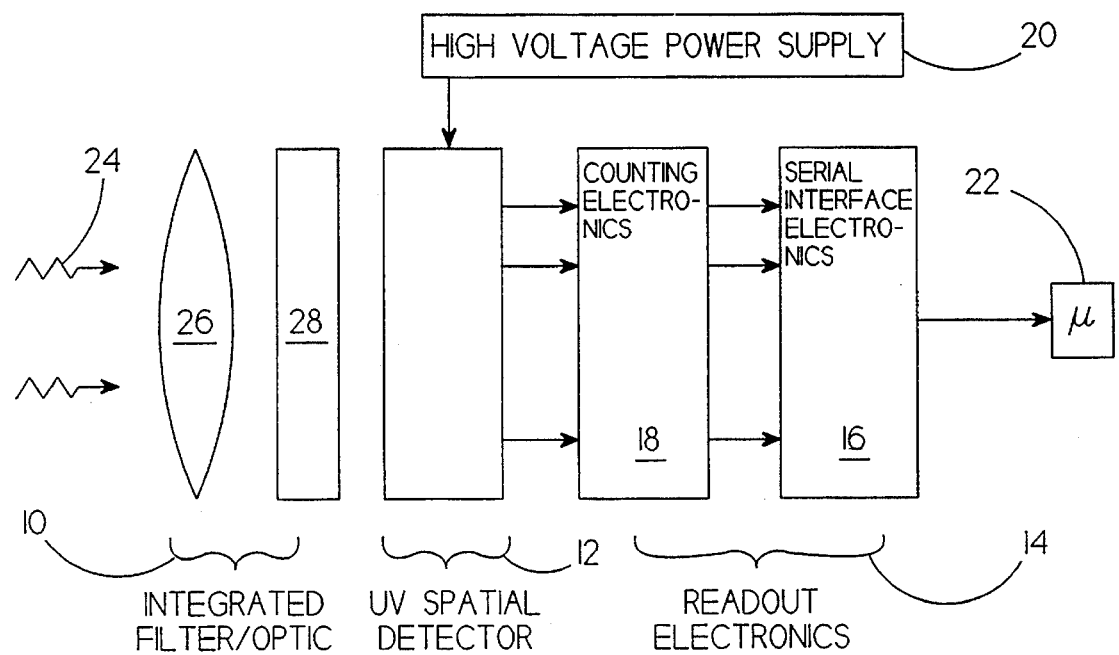
FIG. 1 shows a schematic diagram of the ultraviolet spatial sensor of the invention.

FIG. 1 shows a schematic diagram of the ultraviolet spatial sensor of the invention. Incident radiation 24 is received through an integrated filter-optic system 10. The integrated filter-optic system 10 is comprised of a lens 26 and a filter 28, such as an ultraviolet filter. The integrated filter-optic system 10 provides an image to an ultraviolet spatial detector 12. The ultraviolet spatial detector 12 is comprised of a 100 pixel discrete anode array using a high strip current microchannel plate position sensitive detector.

In one preferred embodiment of the invention, the integrated filter-optic system 10 provides a wide field of view integrated filter-optic assembly which provides a compact system with a low f/#.

The ultraviolet spatial detector 12 is powered by a high voltage power supply 20. The ultraviolet spatial detector 12 provides counting electronics 18 with the signal proportional to the incident radiation 24 from the scene of interest. The counting electronics are optionally sent to a computer processor 22 through serial interface 16, or may be provided directly to the computer processor 22.

Figure 2:
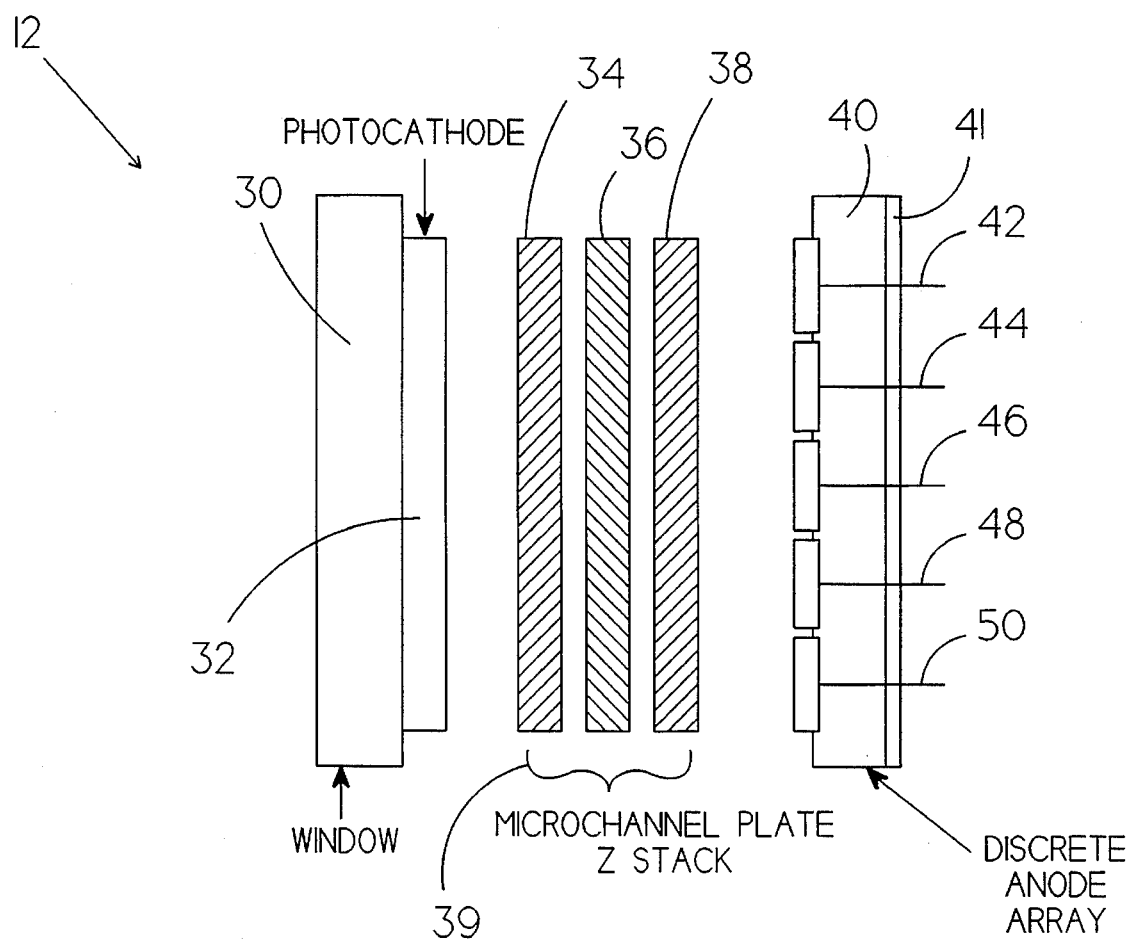
FIG. 2 shows a multi-anode microchannel plate photomultiplier used in an ultraviolet spatial sensor of the invention.

FIG. 2 shows a multi-anode microchannel plate photomultiplier used in the ultraviolet spatial detector 12 of the invention. An optical window 30 is in contact with photocathode 32. The window views a scene of interest. In one preferred embodiment of the invention the photocathode 32 may be a 40 mm active diameter photocathode. The photocathode 32 responds to ultraviolet radiation and rejects longer wavelengths when mated with a filter. In one embodiment, the photocathode 32 is of the RbCsTe variety. A stack of three microchannel plate electron multipliers 34, 36, and 38 in a Z configuration are used to amplify the electron signal from the photocathode 32. The microchannel plate electron multipliers provide an internal gain mechanism for generating electrons in response to output of the photocathode 32. The microchannel plate Z stack 39 is comprised of an array of channel electron multipliers fused into a single element. Such microchannel plates are known and are commercially available. However, those skilled in the art will recognize that such microchannel plates are not to be confused with devices such as conventional dynode electron multipliers which do not preserve spatial relationships. The microchannel plate 39 preserves the spatial distribution of the irradiance pattern at the photocathode 32 during the multiplication process.

Those skilled in the art will also recognize that any electron gain medium that preserves the spatial distribution of the electron signal will accomplish a similar result.

A multi-element discrete anode array, comprising a plurality of anodes which are regularly spaced in a grid pattern, follows in the signal path after the microchannel plate 39. In one preferred embodiment of the invention there are 100 discrete anodes arranged in an array of 10×10 metal pads. The discrete anode array 40 is used for charge collection.

Referring simultaneously now to FIG. 2 and FIG. 3, FIG. 3 shows the 10×10 discrete anode array with square pixels. Each of the pixels, shown as, for example, 42, 44, 46, 48 and 50, are equal in size. The discrete anode array is configured to preserve the spatial distribution of the irradiance pattern. The discrete anode array is interfaced to counting electronics via a 100-element pin grid array 41. The sensor created from this configuration is a passive uncooled sensor with no moving parts. The sensor is a continuous staring device producing an uninterrupted spatio-temporal signature of absorbed targets.

Because the sensor employs photon counting it is able to detect extremely low irradiance levels. In the photon counting sensor, the detector converts photo events into current pulses. These current pulses are then sensed by the processing electronics shown in more detail in FIG. 4. The electronics integrate the number of pulses arriving over a fixed integration time interval. The total count observed during that interval is directly proportional to the number of photons which arrived during that interval and hence is a measure of the incident radiation. Since the sensor preserves the spatial distribution of the irradiance pattern, it also provides a spatial measurement of the incident radiation on a pixel by pixel basis. This form of irradiance measurement is more sensitive than simply measuring the average output current from the detector because individual photo events (i.e. individual photons) are discerned.

Those skilled in the art will appreciate that the window 30 may be comprised of a filter-optic combination having lenses and filtering functions combined into a single subassembly. Those skilled in the art will also recognize that the filter-optic may cover a wide conical field of view.

Refer now to FIG. 4, FIG. 4 shows the signal processing electronics in block diagram form employed in the ultraviolet spatial sensor of the invention. The discrete anode array 40 is shown driving an amplifier circuit 70. For simplicity only two of the amplifier circuits are shown. In one preferred embodiment there would be one amplifier circuit for each discrete anode in the discrete anode array 40. The preamplifier 52 accepts the signal from the discrete anode pixel 42. The signal is amplified and fed to comparator 56 which compares a signal to a predefined threshold. The output of the comparator 56 is sent to an eight-bit counter to count the photo events from the anode 42. The eight-bit counter 60 is fed to an eight-bit latch 64 so that its value may be read using serial interface electronics 16.

In one preferred embodiment of the invention the readout electronics comprise a serial interface which is sent to a central processing unit 22. Likewise the other discrete anodes are read using similar circuitry. For example, the readout electronics 72 for anode 50 has a similar preamplifier 54. The amplifier 54 is connected to a comparator 58 which connects to an eight-bit counter 62 and an eight-bit latch 66. The serial interface 16 is provided to minimize the number of interconnections to the central processor 22. Those skilled in the art will recognize that other addressing schemes will work with the invention.

Those skilled in the art will also recognize that the comparator 58 serves to reject low amplitude noise pulses originating in the detector. It also acts as a one-bit analog to digital converter to prepare the incoming pulses for digital counting. The eight-bit counter 60 integrates all pulses during a sample period. The latch 64 stores the resulting total count. The counter 60 is then free to reset and begin accumulating the next frame of data. The latch 64 stores a frame of data for transfer along the serial interface 16 for communication to the CPU 22. In one example of the invention, the count output is provided at a rate of at least a four kilohertz frame rate.

Those skilled in the art will recognize that the electronics may be embodied in surface mounted electronics within a spatial sensor.

In operation the discrete anode array provides a level of resolution that may be designed to meet predefined objectives. The number of discrete anodes may be varied to provide a predetermined resolution. Other anode configurations are also possible because the microchannel plate preserves the spatial distribution of the radiation pattern.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A spatial sensor apparatus comprising:
   (a) an integrated filter-optic means for projecting a view of a scene in a predetermined frequency range having a scene output, where the integrated filter-optic means is comprised of a wide field of view lens integrated with an ultraviolet filter; and
   (b) a photon counting spatial detector means for detecting photons of the predetermined frequency range and conserving their spatial position, wherein the photon counting spatial detector means is coupled to the scene output and has an image output.

2. The spatial sensor apparatus of claim 1 further comprising a counting means for counting photons coupled to the image output having a count output proportional to a number of incident photons at predetermined positions.

3. The spatial sensor apparatus of claim 1 wherein the photon counting spatial detector means comprises an anode array having at least 100 pixel anodes and a microchannel electron multiplying plate coupled to the anode array.

4. The spatial sensor apparatus of claim 2 wherein the count output is interfaced to a computer processor.

5. The spatial sensor apparatus of claim 2 wherein the count output is provided to a computer processor through a serial interface.

6. The spatial sensor apparatus of claim 2 wherein the count output is provided at a rate of at least a four kilohertz frame rate.

7. The spatial sensor apparatus of claim 1 wherein the photon counting spatial detector means provides a continuous staring operation with no more than 250 nanoseconds of dead time between frames.

8. The spatial sensor apparatus of claim 1 wherein the integrated filter-optic means detects images in the middle ultraviolet range while rejecting radiation outside the middle ultraviolet range.

9. A radiation sensing spatial sensor apparatus comprising:
   (a) an integrated filter-optic means for projecting a view of a scene in a predetermined frequency range having a scene output, where the integrated filter-optic means is comprised of a wide field of view lens integrated with an ultraviolet filter;
   (b) an imaging means for capturing radiation having an electron output, the imaging means being positioned to receive radiation transmitted through the integrated filter-optic means;
   (c) a spatial distribution preserving electron multiplying means having an electron input coupled to the electron output and wherein the spatial distribution preserving electron multiplying means also has a gain electron output; and
   (d) a means for spatially sensing an electron distribution having a spatial distribution input coupled to the gain electron output.

10. The radiation sensing spatial sensor apparatus of claim 9 wherein the imaging means further comprises a lens and a photocathode.

11. The radiation sensing spatial sensor apparatus of claim 9 wherein the spatial distribution preserving electron multiplying means comprises a microchannel plate Z stack.

12. The radiation sensing spatial sensor apparatus of claim 9 wherein the means for spatially sensing comprises a discrete anode array.

13. The radiation sensing spatial sensor apparatus of claim 9 wherein the means for spatially sensing comprises a discrete anode array comprising a plurality of anodes which are regularly spaced in a grid pattern.

14. The radiation sensing spatial sensor apparatus of claim 12 wherein the discrete anode array is arranged in a pattern to match the imaging means.

15. The radiation sensing spatial sensor apparatus of claim 10 where the photocathode is comprised of RbCsTe.

16. The radiation sensing spatial sensor apparatus of claim 9 wherein the radiation is in the ultraviolet range.

* * * * *